United States Patent
Arena

(10) Patent No.: US 7,948,983 B2
(45) Date of Patent: May 24, 2011

(54) METHOD, COMPUTER PROGRAM PRODUCT, AND APPARATUS FOR PROVIDING PASSIVE AUTOMATED PROVISIONING

(75) Inventor: Scott David Arena, Peabody, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 931 days.

(21) Appl. No.: 11/614,154

(22) Filed: Dec. 21, 2006

(65) Prior Publication Data

US 2008/0151892 A1 Jun. 26, 2008

(51) Int. Cl.
*H04L 12/56* (2006.01)
(52) U.S. Cl. ........ 370/392; 370/216; 370/217; 370/254; 370/468; 709/222
(58) Field of Classification Search .................. 370/217, 370/222, 252, 254, 468, 216; 709/222; 714/11
See application file for complete search history.

(56) References Cited

U.S. PATENT DOCUMENTS

| 6,108,300 | A | * | 8/2000 | Coile et al. ..................... 370/217 |
| 6,202,169 | B1 | | 3/2001 | Razzaghe-Ashrafi et al. |
| 6,757,242 | B1 | * | 6/2004 | Wang et al. .................... 370/216 |
| 6,775,278 | B1 | | 8/2004 | Britton et al. |
| 7,200,649 | B1 | * | 4/2007 | Batke et al. .................... 709/222 |
| 2001/0056503 | A1 | | 12/2001 | Hibbard |
| 2004/0215752 | A1 | | 10/2004 | Satapati et al. |
| 2006/0029097 | A1 | * | 2/2006 | McGee et al. ................. 370/468 |
| 2006/0056313 | A1 | * | 3/2006 | Rietschel ....................... 370/254 |
| 2006/0107108 | A1 | * | 5/2006 | Geng et al. ..................... 714/11 |

* cited by examiner

*Primary Examiner* — Robert W Wilson
*Assistant Examiner* — Mohamed Kamara

(57) ABSTRACT

An apparatus for providing passive automated provisioning may include an address monitoring element and an address provisioning element in communication with the address monitoring element. The address monitoring element may be configured to issue a first query for a device assigned to a monitoring address. The address provisioning element may be configured to assume or maintain a passive address, different than the monitoring address, if another device responds to the first query and to invoke an address replacement routine if no other device responds to the first query.

25 Claims, 4 Drawing Sheets

METHOD, COMPUTER PROGRAM PRODUCT, AND APPARATUS FOR PROVIDING PASSIVE AUTOMATED PROVISIONING

BACKGROUND INFORMATION

In a typical network such as, for example, an IEEE 802.3 network, it is not allowable to configure two devices to have the same Internet Protocol (IP) address at the same time. Configuring two devices to have the same IP address would cause conflicts and collisions due to inherent operation of the protocol and network. In this regard, contention over a shared IP address between devices may cause collisions along with dropped and/or intermittent traffic on the network. Accordingly, only a single device is assigned to each IP address at any one time.

In a network where device redundancy is desirable for improved operation of the network, manual replacement of a failed device is typically performed to provide such redundancy and still avoid having two devices with the same IP address. However, even in situations where care is taken to perform such replacements in a timely manner there may be certain time sensitive applications or equipment for which the loss of such applications or equipment for any length of time is not desirable under any circumstances. Furthermore, some equipment may be remotely located, thereby requiring the dispatch of technicians to the remote location of the equipment for manual replacement thereby increasing cost and network downtime. As such, manual replacement in the event of failed devices may be costly in terms of both reductions in the quality of network operation and increases in expense and potential loss of service and revenue.

BRIEF DESCRIPTION OF THE SEVERAL VIEWS OF THE DRAWING(S)

DETAILED DESCRIPTION

Exemplary embodiments are described hereinafter with reference to the accompanying drawings, in which exemplary embodiments and examples are shown. Like numbers refer to like elements throughout.

One or more embodiments may be implemented as a method, a device, or a computer program product. Accordingly, an embodiment may take the form of an entirely hardware embodiment, an entirely software embodiment, or an embodiment combining software and hardware aspects. Furthermore, implementations of an embodiment may take the form of a computer program product including a computer-readable storage medium having computer-readable program instructions (e.g., computer software) embodied in the storage medium. More particularly, implementations of certain embodiments may take the form of web-implemented computer software. Any suitable computer-readable storage medium may be utilized including hard disks, CD-ROMs, optical storage devices, or magnetic storage devices.

In certain embodiments referenced herein, a "computer" or "computing device" may be described. Such a computer may be, for example, a mainframe, server, desktop, laptop, or a hand held device such as a data acquisition and storage device, or it may be a processing device embodied within another apparatus such as, for example, a set top box for a television system or a wireless telephone. In some instances the computer may be a "dumb" terminal used to access data or processors over a network.

In certain embodiments referenced herein, a "network" or "network system" may be referenced. Such a network may be considered for example, a personal area network (PAN), a local area network (LAN), a wide area network (WAN), the Internet, etc. Such networks may include one or more devices, such as computers and peripheral devices. The networks may be configured to communicate with one or more external devices, systems, networks, or other sources through one or more interfaces. More specifically, one or more of the computers or peripheral devices may be configured to receive and/or transmit information to or through an external device, system, network, or other external source.

Figure 1:
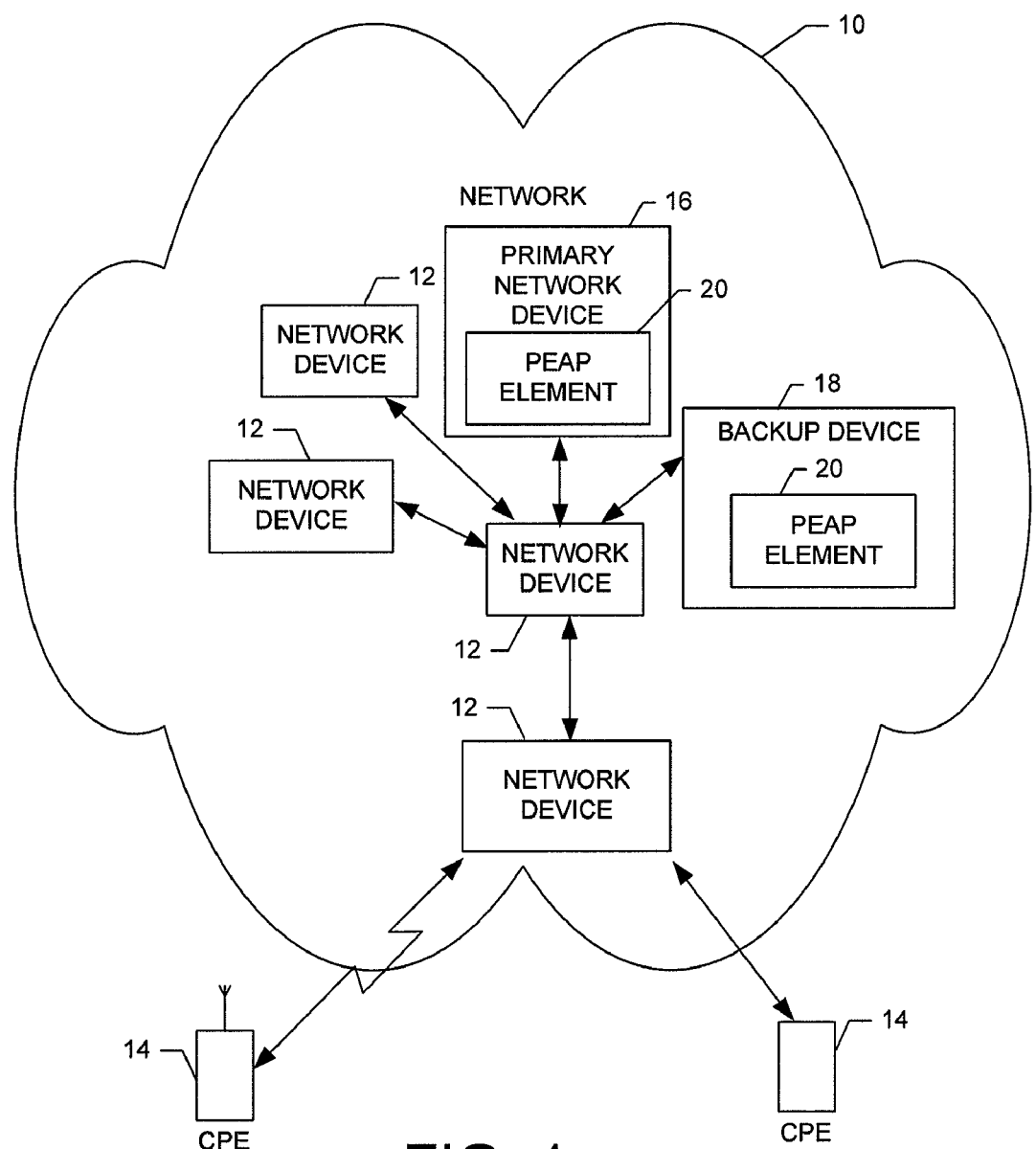
FIG. 1 illustrates a block diagram of a network that may benefit from an examplary embodiment.

For example, and as shown in FIG. 1, a network 10 may provide communication between a variety of network devices 12 and customer premises equipment (CPE) 14. The network devices 12 may include one or more routers, gateway devices, servers, computers, etc. each of which may have a unique address such as an IP address. The user equipment 14 could be, for example, a mobile phone, personal computer, PDA, laptop computer or various other types of fixed and/or mobile communication terminals each of which may be in communication with the network 10 by either wired or wireless communication links. The network 10 could be, for example, a public switched telephone network (PSTN), a wireless network, a private packet switched network, or various other types of networks capable of providing data and/or communication services such as Voice over Internet Protocol (VoIP), Internet access, asymmetric digital subscriber line (ADSL) services, etc.

Providing network device redundancy may be desirable. Thus, according to an exemplary embodiment, a particular one of the network devices 12 (e.g., a primary network device 16) may be associated with a backup device 18. In an exemplary embodiment, the primary network device 16 and the backup device 18 may each employ a passive automatic provisioning element such as a Passive Ethernet Automatic Provisioning (PEAP) element 20 although embodiments may be practiced in any network using addressing such as IP addressing. It should be noted that although FIG. 1 illustrates only one primary network device having an associated backup device and PEAP element 20, any or all of the network devices 12 may have an associated backup device and each of the devices (i.e., any or all of the network devices 12 and their respective backup devices) may include the PEAP element 20. Additionally, although FIG. 1 illustrates only one backup device (e.g., the backup device 18) for the primary network device 16, it should be understood that any number of backup devices having the PEAP element 20 could alternatively be associated with the primary network device 16. As will be described in greater detail below, the PEAP element 20 allows automatic device redundancy by enabling the backup device 18 to automatically assume the IP address of the primary network device 16 in the event of a failure of the primary network device 16 or if the primary network device 16 loses communication with the network 10 for any reason. Upon assumption of the primary IP address, the backup device 18 may assume a primary network device role. Additionally, if the primary network device 16 comes back online or otherwise restores communication with the network 10, the primary network device 16 may assume a backup device role.

In an exemplary embodiment, the PEAP element 20 may include two modes of operation. In a first mode (e.g., a backup mode), the PEAP element 20 may correspond to the backup device 18. The backup device 18 may be in communication with the network having a backup or alternate IP address. In the backup mode, the PEAP element 20 of the backup device 18 may be configured to monitor a primary IP address (e.g., the IP address of the primary network device 16), for example, at a predefined interval. While monitoring the primary IP address in the backup mode, the PEAP element 20 may be configured to provide a query regarding the primary IP address. The query may be considered as a request for the device associated with the primary IP address (e.g., the primary network device 16) to identify itself. Responsive to receipt of a response from the primary network device 16 indicating that the primary network device 16 is associated with the primary IP address, the PEAP element 20 of the backup device 18 may remain in the backup mode and continue to monitor the primary IP address at the predefined interval. However, if no reply is received in response to the query, the PEAP element 20 of the backup device 18 may shift to a second mode (e.g., a primary mode) by conducting a reset or restart of the backup device 18 and binding the backup device 18 to the primary IP address. In the primary mode, the backup device 18 automatically assumes the primary IP address and operates as a replacement for the primary network device 16. Meanwhile, the PEAP element 20 of the primary network device 16 may operate in the primary mode at least until the primary network device 16 loses communication with the network 10 for any reason. After restoration of the primary network device 16, the PEAP element 20 of the primary network device 16 may shift to backup mode and the primary network device 16 may assume a backup or alternate address (e.g., a passive address) while the backup device 18 continues to function in the primary mode.

By assuming the primary IP address, the backup device 18 reads and responds to messages sent over the network 10 to the primary IP address. Additionally, the backup device 18 sends messages originating from the primary IP address.

In an exemplary embodiment, one or a series of IP addresses may be assigned as fixed or static backup or alternate addresses which may be associated with various devices operating in the backup mode. However, in an alternative exemplary embodiment, a backup address could be dynamically assigned. In this regard, upon assumption of or shifting to the backup mode, a device may acquire a backup address by checking network IP addresses for an address that is currently unassigned. When a currently unassigned address is located, the device may assume the unassigned address as a backup address while monitoring a primary monitoring address such as the primary IP address.

The primary network device 16 and the backup device 18 may also conduct periodic synchronization in order to synchronize data between the devices. Such synchronization may be performed at an interval determined based upon the criticality of the devices with respect to the data, if any, they contain. Accordingly, if the primary network device 16 loses communication with the network 10, the backup device 18 may take over the primary IP address to provide redundancy with a reduced amount of missing data.

The PEAP element 20 may be any means or device embodied in either hardware, software, or a combination of hardware and software capable of monitoring a particular IP address and assuming the particular IP address in response to a determination that communication is lost with the original device associated with the particular IP address or at least that no other device is currently associated with the particular IP address. The PEAP element 20 may embodied as or operate under the control of a processing element. In an exemplary embodiment, the PEAP element 20 may be embodied as an algorithm or as software configured to perform the functions associated with the PEAP element 20 as described herein.

Figure 2:
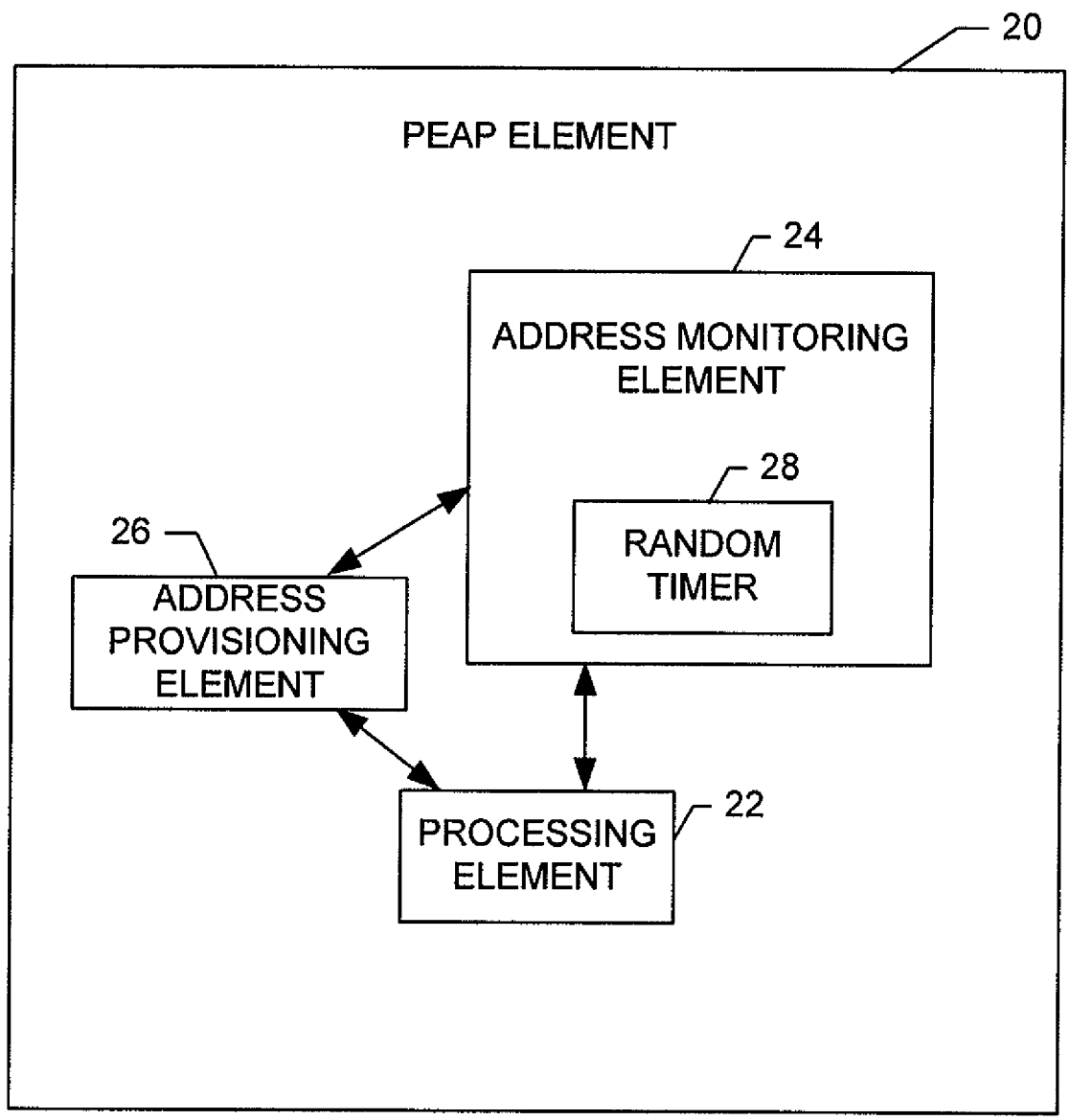
FIG. 2 is a schematic block diagram of a Passive Ethernet Automatic Provisioning (PEAP) element according to an exemplary embodiment.

FIG. 2 shows a block diagram of the PEAP element 20 according to an exemplary embodiment. As shown in FIG. 2, the PEAP element 20 may include a processing element 22 which may control or otherwise be in communication with an address monitoring element 24 and an address provisioning element 26. Processing elements as described herein may be embodied in many ways. For example, the processing element 22 may be embodied as a processor, a coprocessor, a controller or various other processing means or devices including integrated circuits such as, for example, an ASIC (application specific integrated circuit). The address monitoring element 24 and the address provisioning element 26 may each be any device or means embodied in either hardware, software, or a combination of hardware and software capable of performing functions associated with the address monitoring element 24 and the address provisioning element 26, respectively, as described below. For example, the address monitoring element 24 and the address provisioning element 26 may be part of the processing element 22.

As stated above, the backup device 18 may initially be assigned a backup or alternate IP address (e.g., a PEAP passive address (PPA)). While in the backup mode, the PEAP element 20 of the backup device 18 may be configured to monitor the primary IP address (e.g., the address initially assigned to the primary network device 16 which may be referred to as a PEAP monitoring address (PMA)). Such monitoring may be performed by the address monitoring element 24 of the PEAP element 20. The address monitoring element 24 may be configured to send the query, for example, at a predefined interval to determine whether a device is associated with the primary IP address. In this regard, the address monitoring element 24 may receive an indication of which primary IP address to monitor and/or the predefined interval, each of which may be provided, for example, by a network operator. The predefined interval could be determined based upon the criticality of the primary network device 16 to operation of the network 10. For example, the primary network device 16 could be a PC server, a DHCP server, a timing source such as a GPS master clock, or any of various other network devices which may each have an associated criticality with regard to network operation. In an exemplary embodiment, the network operator could set the predefined interval. Alternatively, the network operator could define a criticality associated with the primary IP address and a predefined interval corresponding to the criticality may be utilized in connection with address monitoring.

As stated above, in an exemplary embodiment, the address monitoring element 24 may be configured to query for acknowledgement from a device associated with the primary IP address (e.g., the PMA). If no response is received, for example, after a predetermined number of attempts or queries or within a predetermined amount of time, the address monitoring element 24 may send an indication to the address provisioning element 26 to cause the address provisioning element 26 to operate to associate the device corresponding to the address monitoring element 24 and the address provisioning element 26 (e.g., the backup device 18) to assume the primary IP address (e.g., shift from the PPA to the PMA). The query may be performed in any suitable manner. For example, in an exemplary embodiment, the address monitoring element 24 may be configured to issue Ping commands at the predefined interval and verify receipt of a successful reply. In an alternative exemplary embodiment, the address monitoring element 24 may be configured to use Address Resolution Protocol (ARP) messages and monitor for a response at the predefined interval in order to monitor the PMA.

The address provisioning element 26 may be configured to provision an address for its corresponding device (e.g., a first device) based at least in part on the mode of operation of the first device as determined based on whether another device is assigned the primary IP address when the first device comes online. In other words, when the first device is brought online, the corresponding PEAP element 20 of the first device may include information designating a primary IP address (e.g., PMA) and a backup address (e.g., PPA) and, responsive to a determination by the address provisioning element 26 as to whether the PMA is currently assigned to another device, the PEAP element 20 will determine a mode of operation for the first device. For example, if a second device responds that it is currently assigned the primary IP address, the first device may assume a backup mode and a role as a backup device. However, if no device responds as currently being assigned the primary IP address, the first device may assume a primary mode and act as a primary network device. The address provisioning element 26 may be configured to bind the device corresponding to the address monitoring element 24 and the address provisioning element 26 (e.g., the backup device 18) to the PMA in response to a determination that no device is currently assigned to the PMA at the time of a query. In an exemplary embodiment, the address provisioning element 26 may be configured to switch the IP address of the backup device 18 to that of the primary IP address by restarting or rebooting the backup device 18 in order to bind a media access control (MAC) address of the backup device 18 to the primary IP address.

As stated above, there may be multiple backup devices monitoring a single IP address in order to provide further redundancy. In such situations, it may be desirable to provide a mechanism to reduce the possibility of two or more backup devices trying to assume the primary IP address at the same time. Accordingly, in one exemplary embodiment, the address monitoring element 24 may include a random timer 28 which may be configured to count a random amount of time. As such, the address monitoring element 24 may be configured to perform a second query in response to a failure to receive a reply to a first query. The address monitoring element 24 may thus be configured to wait the random amount of time determined by the random timer 28 before providing the second query. Accordingly, if multiple backup devices are employed and a corresponding primary network device is lost, although more than one of the backup devices may fail to receive a response to the first query, only the one of the multiple backup devices having the shortest random amount of time determined by its corresponding random timer may also fail to receive a response to the second query. The one of the multiple backup devices having the shortest random amount of time as determined by its corresponding random timer may then assume the primary IP address such that other backup devices receive a reply in response to their corresponding second queries and remain in backup roles. It is noted that the reply received by the other backup devices will have been provided in this embodiment by the former backup device having the shortest random amount of time that has now assumed the primary IP address.

It should be noted that other mechanisms for preventing collisions between devices attempting to assume the primary IP address at the same time may also be employed. In this regard, for example, a predefined order or priority could be supplied for each of the backup devices which may define which backup device will shift to primary mode when the current primary network device is lost. Alternatively, fixed timing differences between each of the backup devices could be defined so that collisions may be prevented.

In operation, the roles of primary network device 16 and backup device 18 are not fixed, but may be determined during setup of the network 10 and at various times during operation of the network when a primary network device loses communication with the network 10 for any reason. In this regard, each one of the network devices 12 which is equipped with the PEAP element 20 is capable of being either a backup or primary network device.

Figure 3:
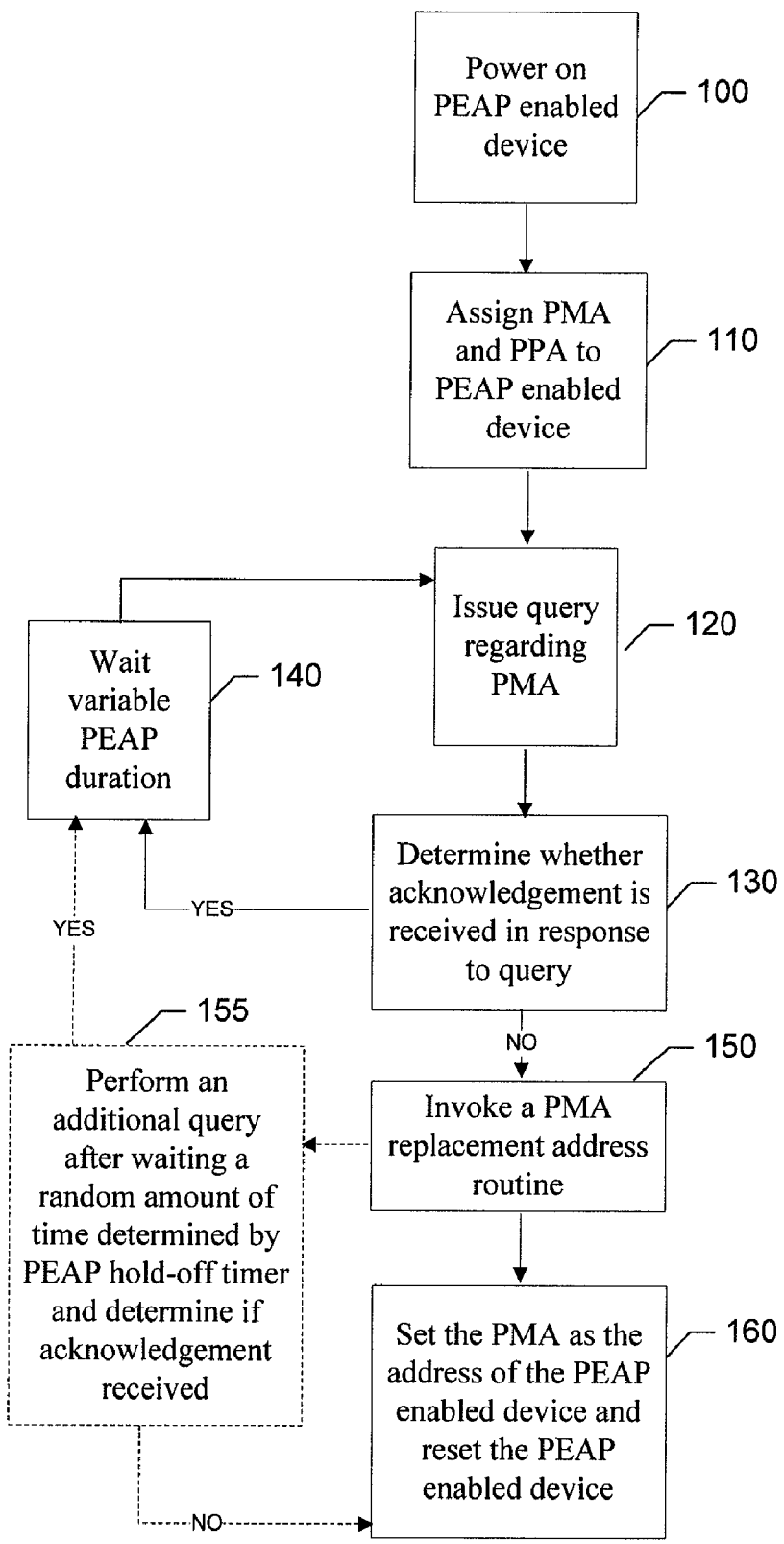
FIG. 3 illustrates a flow diagram illustrating operation of a PEAP enabled device according to an exemplary embodiment.

FIG. 3 illustrates a flow diagram illustrating operation of a PEAP enabled device according to an exemplary embodiment. During initialization each PEAP enabled device (i.e., devices having the PEAP element 20) may be powered on or booted at operation 100. At operation 110, a PPA and PMA may be assigned to the PEAP enabled device. If dynamic address assignment is utilized, the address provisioning element 26 may provision a backup address dynamically as described above. Upon connection to the network, the PEAP enabled device may issue a query regarding the PMA at operation 120. In an exemplary embodiment, a delay or variable PEAP duration may be defined between which each query is issued. At operation 130, a determination is made as to whether an acknowledgement is received to the query. If a positive acknowledgement is received in response to the query (i.e., another device is currently assigned the PMA), the PEAP enabled device may wait the variable PEAP duration to provide another query at operation 140. If no acknowledgement is received in response to the query, the PEAP enabled device may invoke a PMA replacement address routine at operation 150. At operation 160, the PEAP enabled device may set the PMA as the IP address of the PEAP enabled device and a reset or reboot of the PEAP enabled device may be performed to bind the MAC address of the PEAP enabled device to the PMA. Operation 160 may, for example, shift the PEAP enabled device from backup mode to primary mode.

It should also be noted that, as described above, a random timer (e.g., the random timer 28) which may alternatively be referred to as a PEAP hold-off timer may be employed. In such a situation, the PEAP hold-off timer may introduce an additional operation within the method described above that is shown in broken lines in FIG. 3. In this regard, the replacement address routine may include a further operation 155 of performing an additional query after waiting the random amount of time determined by the PEAP hold-off timer. If a positive acknowledgement is received in response to the additional query, the PEAP enabled device may wait the variable PEAP duration to provide another query at operation 140. If no acknowledgement is received in response to the query, the PEAP enabled device may set the PMA as the IP address of the PEAP enabled device and a reset of the PEAP enabled device may be performed to bind the MAC address of the PEAP enabled device to the PMA at operation 160.

Figure 4:
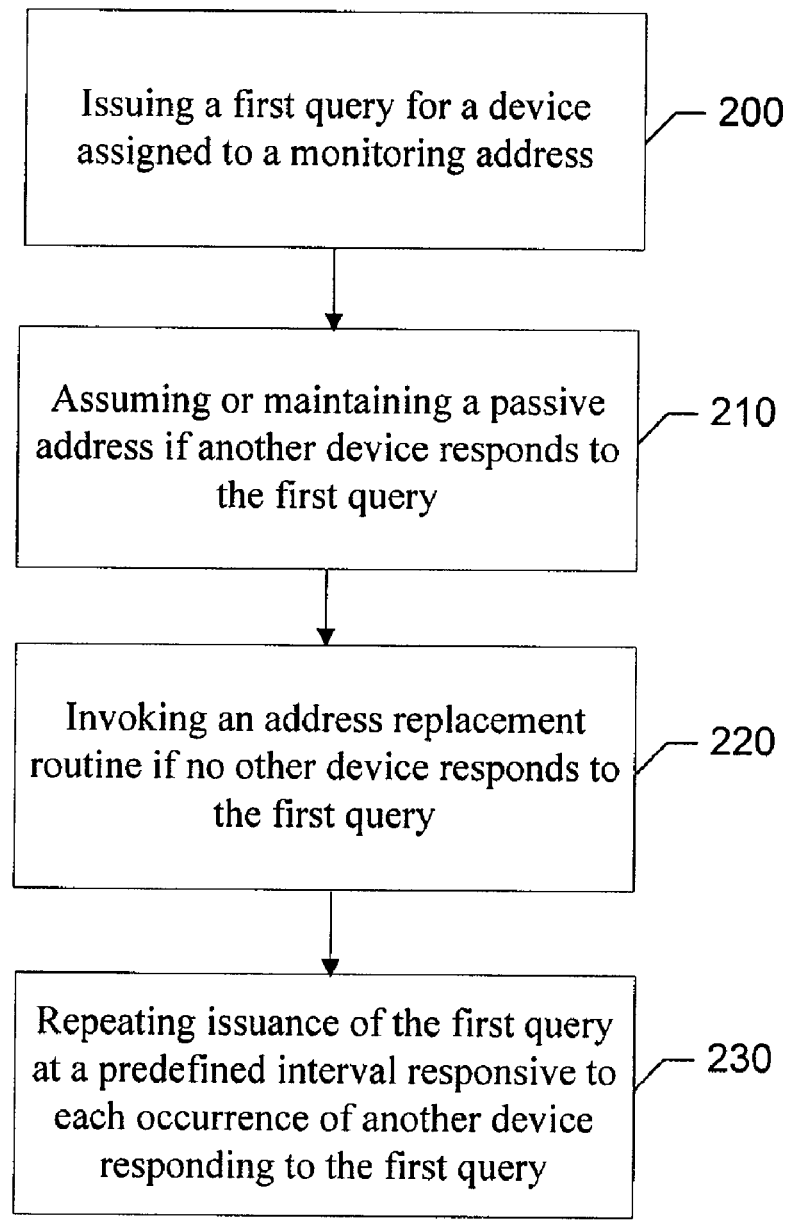
FIG. 4 is a flow chart of a method according to an exemplary embodiment.

FIG. 4 is a flow chart of a method of providing passive Ethernet automatic provisioning according to an exemplary embodiment. In this regard, the method may include issuing a first query for a device assigned to a monitoring address at operation 200. At operation 210, a passive address, different than the monitoring address, may be associated if another device responds to the first query. In this regard, by associating the passive address, a device employing operation 210 may, for example, assume or maintain the passive address depending on whether the method is performed during a startup or steady state operation. An address replacement routine may be invoked if no other device responds to the first query at operation 220. The method may also include operation 230 in which issuance of the first query is repeated at a predefined interval responsive to each occurrence of another device responding to the first query. In an exemplary embodiment, operation 220 may include waiting a random amount of time and issuing a second query, and assuming the monitoring address if no other device responds to the second query. The query could be performed, for example, using Ping commands or ARP messages. The address replacement routine may include setting the monitoring address as the address of the device performing the method and resetting or rebooting the device to bind a MAC address of the device to the monitoring address.

In an exemplary embodiment, an alternative sequence may be employed in order to ensure that if, for example, a primary device is lost due to a link failure, upon re-establishment of the link both devices will be assigned the PMA. As such, for example, a primary device operating in the primary mode may include a flip bit value. In an exemplary embodiment, a flip bit value of zero may indicate that the primary device has not changed state, while a flip bit value of one may indicate that the primary device has previously flipped to backup mode as described in greater detail below.

According to this example, the flip bit value of zero may be provisioned during initial power up of the primary device. Operation of this example may be substantially similar to that described above in that instead of the device in backup mode being the only device querying for the presence of another device having a particular IP address (e.g., the PMA), the primary device in primary mode may also monitor for the backup device (e.g., the PPA). In other words, the primary device monitors the PPA similar to the way the backup device monitors the PMA.

In this regard, according to one example, the primary device may ARP or ping for the PPA in parallel with the backup device monitoring for the PMA, i.e. at the predefined interval. In response to receipt of a positive acknowledgement, both devices may maintain their states and continue to monitor at the predefined interval. In response to a negative acknowledgement, an address replacement routine may be invoked. In this embodiment, the address replacement routing may include waiting the variable PEAP duration. The primary device may query for the PPA and/or the backup device may query for the PMA again after waiting the predefined interval. In response to receipt of a positive acknowledgement, both devices may maintain their states and continue to monitor at the predefined interval. However, in response to a negative acknowledgement, the primary and backup devices may swap IP addresses. In this regard, the primary device may initially check the flip bit to see if it has already cycled once. If the flip bit value is one, the primary device has already flipped once and will return to monitoring normally at the predefined interval. If the flip bit value is zero, in one embodiment, the primary device sets the PPA as its IP address and also sets the flip bit value to one to indicate the flip in states, or the backup device sets the PMA as its IP address. Either device may then reset to bind their corresponding MAC and IP addresses and continue to monitor at a predefined interval.

In the preceding specification, various embodiments of the claimed invention have been described. It will, however, be evident that various modifications and changes may be made thereunto without departing from the broader spirit and scope of the invention as set forth in the claims that follow. The specification and drawings are accordingly to be regarded in an illustrative rather than restrictive sense.

That which is claimed:

1. A method comprising:
   assigning a criticality value to a primary device, the criticality value based on an importance of the primary device to operation of a network;
   issuing, from a backup device, a first query for the primary device assigned to a monitoring address, the first query issued after a pre-defined interval associated with the criticality value of the primary device, wherein the first query is configured to be issued from the backup device to the primary device via an indirect network connection;
   associating, with the backup device, a passive address, different than the monitoring address, if another device responds to the first query; and
   invoking an address replacement routine if no other device responds to the first query.

2. The method of claim 1, wherein issuing the first query comprises issuing a ping command to the monitoring address.

3. The method of claim 1, wherein issuing the first query comprises issuing an address resolution protocol (ARP) message to the monitoring address.

4. The method of claim 1, wherein invoking the address replacement routine comprises assuming the monitoring address.

5. The method of claim 4, wherein assuming the monitoring address comprises conducting a restart to bind a media access control (MAC) address of the backup device to the monitoring address.

6. The method of claim 1, wherein invoking the address replacement routine comprises waiting a random amount of time and issuing a second query, and assuming the monitoring address if no other device responds to the second query.

7. The method of claim 1, further comprising repeating issuance of the first query at a predefined interval responsive to each occurrence of another device responding to the first query.

8. The method of claim 1, wherein associating the passive address comprises assuming the passive address.

9. The method of claim 1, wherein associating the passive address comprises maintaining the passive address.

10. A non-transitory computer-readable storage medium having computer-readable program code portions which are executable by at least one computer processor, causing the at least one computer processor to:
    assign a criticality value to a primary device and issue a first query for the primary device assigned to a monitoring address, the criticality value based on an importance of the primary device to operation of a network and the first query issued after a pre-defined interval associated with the criticality value of the primary device, wherein the first query is configured to be issued from a backup device to the primary device via an indirect network connection; associate a passive address, different than the monitoring address, with the backup device if another device responds to the first query; and
    invoke an address replacement routine if no other device responds to the first query.

11. The non-transitory computer-readable storage medium of claim 10, wherein the at least one computer processor is configured to issue a ping command or an address resolution protocol (ARP) message to the monitoring address.

12. The non-transitory computer-readable storage medium of claim 10, wherein the at least one computer processor is configured to assume the monitoring address.

13. The non-transitory computer-readable storage medium of claim 12, wherein the at least one computer processor is configured to conduct a restart to bind a media access control (MAC) address of the backup device to the monitoring address.

14. The non-transitory computer-readable storage medium of claim 10, wherein the at least one computer processor is configured to wait a random amount of time and issuing a second query, and assuming the monitoring address if no other device responds to the second query.

15. The non-transitory computer-readable storage medium of claim 10, the at least one computer processor is configured to repeat issuance of the first query at a predefined interval responsive to each occurrence of another device responding to the first query.

16. The non-transitory computer-readable storage medium of claim 10, wherein the at least one computer processor is configured to perform one of assuming the passive address or maintaining the passive address.

17. An apparatus comprising:
an address monitoring element configured to assign a criticality value to a primary device, the criticality value based on an importance of the primary device to operation of a network;
an address monitoring element configured to issue a first query for the primary device assigned to a monitoring address, the first query issued after a pre-defined interval associated with the criticality value of the primary device, wherein the first query is configured to be issued from the address monitoring element to the primary device via an indirect network connection; and
an address provisioning element configured to associate a passive address, different than the monitoring address, with a backup device if another device responds to the first query and to invoke an address replacement routine if no other device responds to the first query.

18. The apparatus of claim 17, wherein the address monitoring element is further configured to issue the first query embodied as a ping command to the monitoring address.

19. The apparatus of claim 17, wherein the address monitoring element is further configured to issue the first query embodied as an address resolution protocol (ARP) message to the monitoring address.

20. The apparatus of claim 17, wherein the address provisioning element is configured to invoke the address replacement routine by assuming the monitoring address.

21. The apparatus of claim 20, wherein the address provisioning element is configured to invoke the address replacement routine by conducting a restart to bind a media access control (MAC) address of the backup device to the monitoring address.

22. The apparatus of claim 17, wherein the address provisioning element is further configured to invoke the address replacement routine by waiting a random amount of time and issuing a second query, and assuming the monitoring address if no other device responds to the second query.

23. The apparatus of claim 17, wherein the address monitoring element is further configured to repeat issuance of the first query at a predefined interval responsive to each occurrence of another device responding to the first query.

24. The apparatus of claim 17, wherein the address provisioning element is configured to assume the passive address.

25. The apparatus of claim 17, wherein the address provisioning element is configured to maintain the passive address.

* * * * *